J. M. WOLFE.
RODENT TRAP.
APPLICATION FILED NOV. 26, 1919.

1,366,995.

Patented Feb. 1, 1921.

INVENTOR.
Jacob M. Wolfe.
BY
ATTORNEY

United States Patent Office.

JACOB M. WOLFE, OF LATHROP, CALIFORNIA.

RODENT-TRAP.

1,366,995.                Specification of Letters Patent.        Patented Feb. 1, 1921.

Application filed November 26, 1919.   Serial No. 340,920.

*To all whom it may concern:*

Be it known that I, JACOB M. WOLFE, a citizen of the United States, residing at Lathrop, in the county of San Joaquin, State of California, have invented certain new and useful Improvements in Rodent-Traps; and I do declare the following to be a full, clear, and exact description of the same, reference being had to the accompanying drawings, and to the characters of reference marked thereon, which form a part of this application.

This invention relates to improvements in rodent traps of the spring-bar type, and is especially adapted and intended to be used in the trapping of gophers.

The principal object of the invention is to provide a trap having a pair of spring trap-bars spaced apart lengthwise of the trap, but both bars being simultaneously sprung by a single actuating means positioned ahead of the bars.

The only place to position a gopher trap is of course at the mouth of a hole made and used as a means of exit by the gopher, who always covers the hole up with a pile of dirt on returning into same, in order to prevent other small animals or snakes from entering.

If someone then opens the hole, the gopher will sooner or later come to the top and again close the hole by pushing a certain amount of dirt ahead of him.

This fact I make use of in the construction of my trap, as will be hereinafter seen.

It is also on account of this fact that the usual single trap-bar trap is inadequate and inefficient for the purpose, since it is the dirt moved by the rodent which actuates the trap rather than the animal itself, and hence the effectiveness of the trap depends on the length of the pile of dirt moved ahead of the gopher.

If the pile of dirt is very short the trap bar is apt to be sprung behind the rodent, leaving him free to again burrow into the ground, or if very long, the trap is sprung ahead of him, leaving him free to retrace his path. Thus in order to capture a gopher with a single-bar trap, conditions must be very favorable.

With my type of trap, however, the construction is such as to render the escape of the gopher highly improbable, no matter what his distance relative to the forward end of the pile of dirt ahead.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
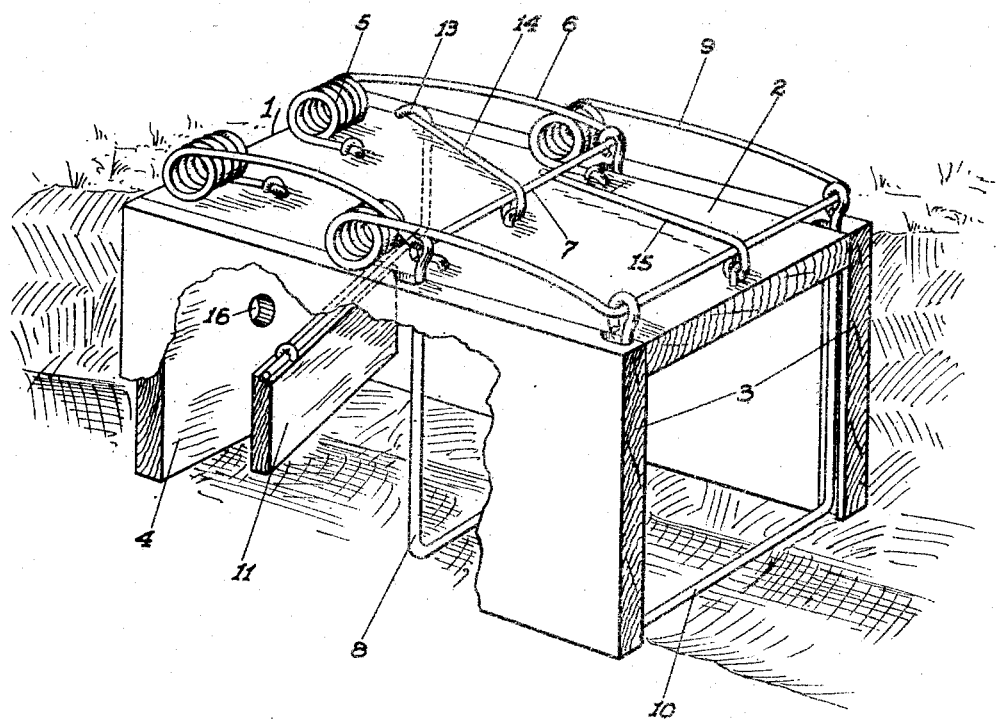
Figure 1 is a perspective elevation of the trap, the adjacent side being broken away to show the interior mechanism.
Figure 2:
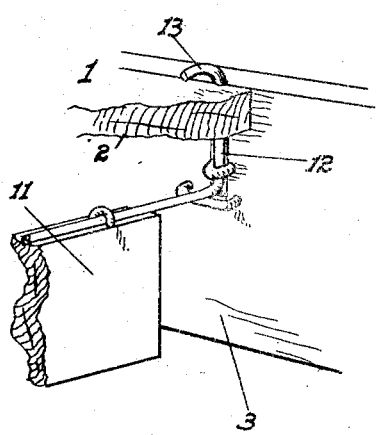
Fig. 2 is a fragmentary view showing the actuating means of the trap-bars.

Referring now more particularly to the characters of reference on the drawings, the numeral 1 denotes the body of the trap, which is substantially a rectangular box open at one end and having no bottom. Of this box, 2 denotes the top, 3 the sides, and 4 the front end piece. Mounted on the top adjacent the front end is the forward trap member comprising a pair of coil springs 5 having arms 6 projecting therefrom lengthwise of the box, said arms being connected by an integral transverse bar 7.

Hung from this bar and projecting into the box 1 and the same width thereas is a U-shaped member 8, which forms the trapping medium and is located about halfway in the box.

Similarly mounted on the box 1 to the rear of the front member is the rear spring trap member 9 also having a U-shaped member 10 depending into the box 1 adjacent the rear end.

The actuating means for the trap members comprises a transverse board or flap 11 in the box and near the front end, and swivelly mounted for horizontal movement to a rod 12 projecting up through the top 2 adjacent one of the side members 3, this rod being turnably mounted in the side.

Above the top the rod 12 bends toward the top member in the form of a hook 13, adapted to hold the end of a bar 14 pivoted centrally of the width of the box just to the rear of the cross bar 7 and passing over the same when said bar 7 is positioned adjacent the top and the trap is set.

Similarly mounted relative to the rear trap member 9 is a bar 15, whose forward end, when the trap is set, is adapted to project under the bar 7.

In operation the trap is positioned adjacent the mouth of the hole, and the open end preferably covered up so as to be light proof.

When the trap is set, the trapping bars 8 and 10 will of course lie adjacent the bottom of the trap as shown in Fig. 1, the flap 11 being then angled somewhat toward the rear end. The gopher, on attempting to emerge from his hole, makes for the light seen through an opening 16 provided in the front end 4, pushing some dirt ahead of him. As soon as the dirt contacts with the flap 11 with sufficient pressure to swing the same, the hook 13 releases the bar 14, which releases and springs the forward trap. At the same time, the bar 15 holding the rear trap is also released, thus springing the rear trap, both actuations occurring at such short intervals from each other as to be practically instantaneous.

Thus if the gopher is not trapped by the forward member, owing to a long pile of dirt, he will be captured by the rear trap, and vice versa.

If found desirable, a third trap member could be mounted to the rear of the trap 9 and arranged to be held thereby in the same manner as said trap is held by the foremost trap.

From the foregoing description it will be readily seen that I have produced such a device as substantially fulfils the object of the invention as set forth herein.

While this specification sets forth in detail the present and preferred construction of the device, still in practice such deviations from such detail may be resorted to as defined by the appended claims.

Having thus described my invention, what I claim as new and useful and desire to secure by Letters Patent is:

1. A trap comprising a box adapted to receive a rodent therein, a pair of spring trap members mounted on the box and having their trapping bars projecting therein, and means in the box ahead of both trap-bars and actuated by the rodent whereby the adjacent trap-bar will be sprung, the springing of said forward trap-bar releasing the rearmost bar.

2. A trap comprising a box adapted to receive a rodent therein, a pair of spring trap members mounted on the box and having their trapping bars projecting therein, in transverse and spaced alinement, a flap in the box ahead of the forward trap and adapted to be moved by the rodent, means coöperating with said flap for holding said trap set, and means coöperating with said trap for holding the other trap set until the first named trap is sprung by the moving of the flap.

3. A trap comprising a box adapted to receive a rodent therein, a pair of spring trap members mounted on the box and having their trapping bars projecting therein, in transverse and spaced alinement, a flap in the box ahead of the forward trap and adapted to be moved by the rodent, a vertical rod connected to the flap turnably mounted in the box and projecting through the top thereof a hook on the upper end of the rod, a bar mounted on the box adapted to project under the hook and holding the adjacent trap member set and a bar similarly mounted adapted to hold the rearmost trap in set position, and being itself held by the foremost trap when set.

In testimony whereof I affix my signature.

JACOB M. WOLFE.